United States Patent [19]
Hoyt et al.

[11] Patent Number: 5,792,015
[45] Date of Patent: Aug. 11, 1998

[54] PUTTING AID

[76] Inventors: David Hoyt; Gary Aldcroft, both of P.O. Box 2408, 1136 W. 135th St., Gardena, Calif. 90247

[21] Appl. No.: 901,120

[22] Filed: Jul. 28, 1997

[51] Int. Cl.⁶ ............................................. A63B 57/00
[52] U.S. Cl. ............................................ 473/404; 33/391
[58] Field of Search ................................. 473/404, 131, 473/407, 405; 33/391, 392, 399, 402

[56] References Cited

U.S. PATENT DOCUMENTS

| | | | |
|---|---|---|---|
| 2,859,725 | 11/1958 | Genasci | 33/391 |
| 3,293,755 | 12/1966 | Cronwell | 473/404 |
| 4,260,151 | 4/1981 | Weaver | 473/404 |
| 5,038,489 | 8/1991 | Muehlenbein | 473/404 |
| 5,492,322 | 2/1996 | Smith | 473/404 |
| 5,662,535 | 9/1997 | Smith | 473/404 |

*Primary Examiner*—Steven B. Wong
*Attorney, Agent, or Firm*—James E. Brunton

[57] ABSTRACT

A putting aid to assist the golfer in accurately predicting the path along which the golf ball will travel in rolling toward the cup along a sloping green. The aid includes a light-weight, hand-held casing which has an easy-to-use viewing window with appropriate indexing lines for reading the slope of the green relative to the location of the putting cut. In using the device, after the cup location and slope of the green are appropriately aligned with the indexing lines provided on the viewing window, a cooperating pendulum and pointer mechanism provides a direct reading in feet of the slope of the green as a function of putting length on an easy-to-read scale imprinted on one face of the casing. The scale permits a reading of the slope of the green in feet either to the left or right as a function of the length of the put.

12 Claims, 6 Drawing Sheets

PUTTING AID

BACKGROUND OF THE INVENTION

1. Field of the Invention

The present invention relates generally to devices usable in playing the game of golf. More particularly, the invention concerns a novel putting aid which can be used by the golfer to determine the amount of break of a golf ball rolling along a sloping green.

2. Discussions of the Prior Art

Typically, putting greens on golf courses are constructed in a sloping configuration. Such a configuration allows proper drainage of water from the green and provides additional challenges to the player. The minimum slope or grade may be on the order of one or two percent and the maximum grade is typically on the order of ten or eleven percent.

With a ball resting on the green in the manner such that the slope is transverse to the direction of roll of the ball toward the cup, the ball will follow a curving path of travel from a first point at which the ball is stroked to a second point as, for example, at the location of the cup. For short puts, the break or lateral distance of the path of travel, is small. However, for long puts of, for example, thirty to forty feet, the break may be as much as three or four feet. Accordingly, in lining up the put on a sloping green the golfer must be able to accurately select a target or aiming point above the cup which will accommodate the break of the ball as it rolls along the green toward the cup. To select this target point, both the distance of the put and the extent of slope of the green must be estimated. Even for an experienced player this estimation can be extremely difficult. For a novice player the estimation can be most difficult and often extremely frustrating. The object of the present invention is to provide a simple, easy-to-use, but quite accurate putting aid that will materially assist both the novice and the experienced player in selecting the proper target point for putting the ball toward the cup on greens of varying slope.

In the past, several different types of devices have been suggested for assisting the golfer in determining the slope of the green. For example, in U.S. Pat. No. 3,535,792, issued to Douglas, a golf sight having a peep hole for viewing the green to determine the slope of the green is disclosed. In U.S. Pat. No. 4,984,791, issued to Label, a green inclination level having a pair of first and second float levels mounted perpendicularly to one another in a hand-held frame is suggested for use in estimating the degree of slope of the green. U.S. Pat. No. 3,293,755, issued to Cornwell, suggests the use of a pendulum type device having a green contacting edge and an indicating pointer to estimate the extent of slope of the green. In still another approach to determining the slope of the green, the patent to Catalano, No. 4,821,114, suggests the use of a plumb bob mounted inside the putter itself to indicate a predicted path of travel of the ball.

The thrust of the present invention is to provide a compact, easy-to-use device which comprises a substantial improvement over the prior art devices and for the first time provides a direct "readout" for the golfer of the amount of break to be anticipated for a put of a given distance on a sloping green.

SUMMARY OF THE INVENTION

It is an object of the present invention to provide a putting aid to assist the golfer in accurately predicting the path along which the golf ball will travel in rolling toward the cup along a sloping green.

More particularly, it is an object of the invention to provide a device of the aforementioned character which will provide to the golfer a direct "readout" on an easy-to-read scale of the amount of break to be expected for a put of a given length.

It is another object of the invention to provide a putting aid which includes a compact, light-weight, hand-held casing having an easy-to-use viewing window with appropriate indexing lines for reading the slope of the green relative to the location of the putting cup.

Another object of the invention is to provide a device of the character described in the preceding paragraphs in which, after the cup location and slope of the green is appropriately aligned with the indexing lines provided on the viewing window, a cooperating pendulum and pointer mechanism provides a direct reading in feet of the slope of the green as a function of putting length on an easy-to-read scale imprinted on one face of the casing. More particularly, the scale permits a reading of the slope of the green in feet either to the left or right as a function of the length of the put.

Another object of the invention is to provide a putting aid of the class described which is of simple design, embodies a minimum number of moving parts, is reliable in operation and can be manufactured inexpensively.

DESCRIPTION OF THE INVENTION

Figure 1:
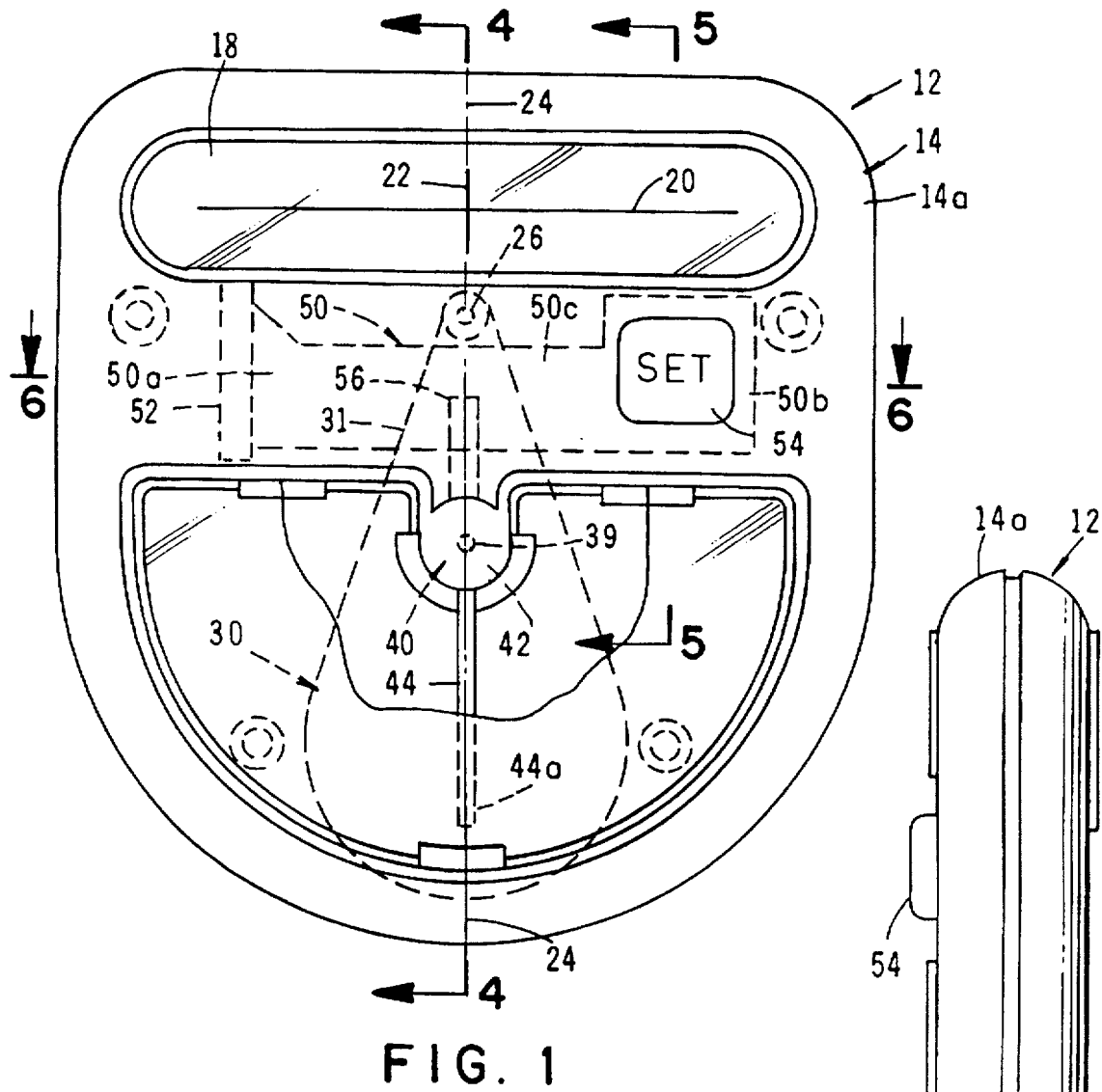
FIG. 1 is a front-elevational view of one form of the putting aid of the invention.
Figure 3:
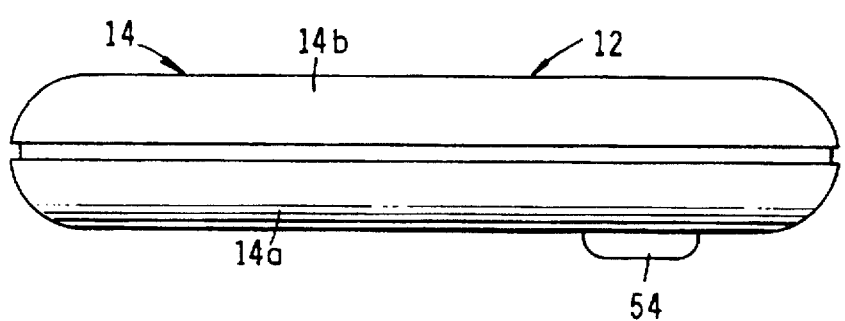
FIG. 3 is a top view of the putting aid.
Figure 2:
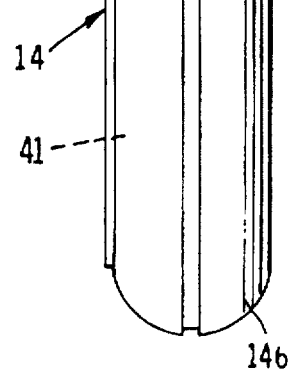
FIG. 2 is a side-elevational view of the putting aid shown in FIG. 1.

Referring to the drawings and particularly to FIGS. 1 through 5, one form of the putting aid of the device for use in determining the amount of break of a golf ball rolling along a sloping green between first and second points is there illustrated and generally identified by the numeral 12. The device here comprises a support or casing 14 formed from two mating halves 14a and 14b respectively. Casing halves 14a and 14b cooperate to define a hollow casing having an internal compartment 16 within which various moving parts of the apparatus are contained.

Casing portions 14a and 14b also support a viewing window 18 which, as best seen in FIG. 1, is provided with a first reference line 20 and a second, perpendicularly extending reference line 22, the purpose of which will presently be described. Viewing window 18 is a preferably constructed of a transparent plastic material and reference lines 20 and 22 and provided thereon in the same or different collars. Reference line 22 is n here aligned with the longitudinal center line, or reference axis of the casing generally designated in FIG. 1 by the numeral 24. On the other hand, reference line 20 extends generally perpendicularly relative to the longitudinal center line.

Figures 7, 8:
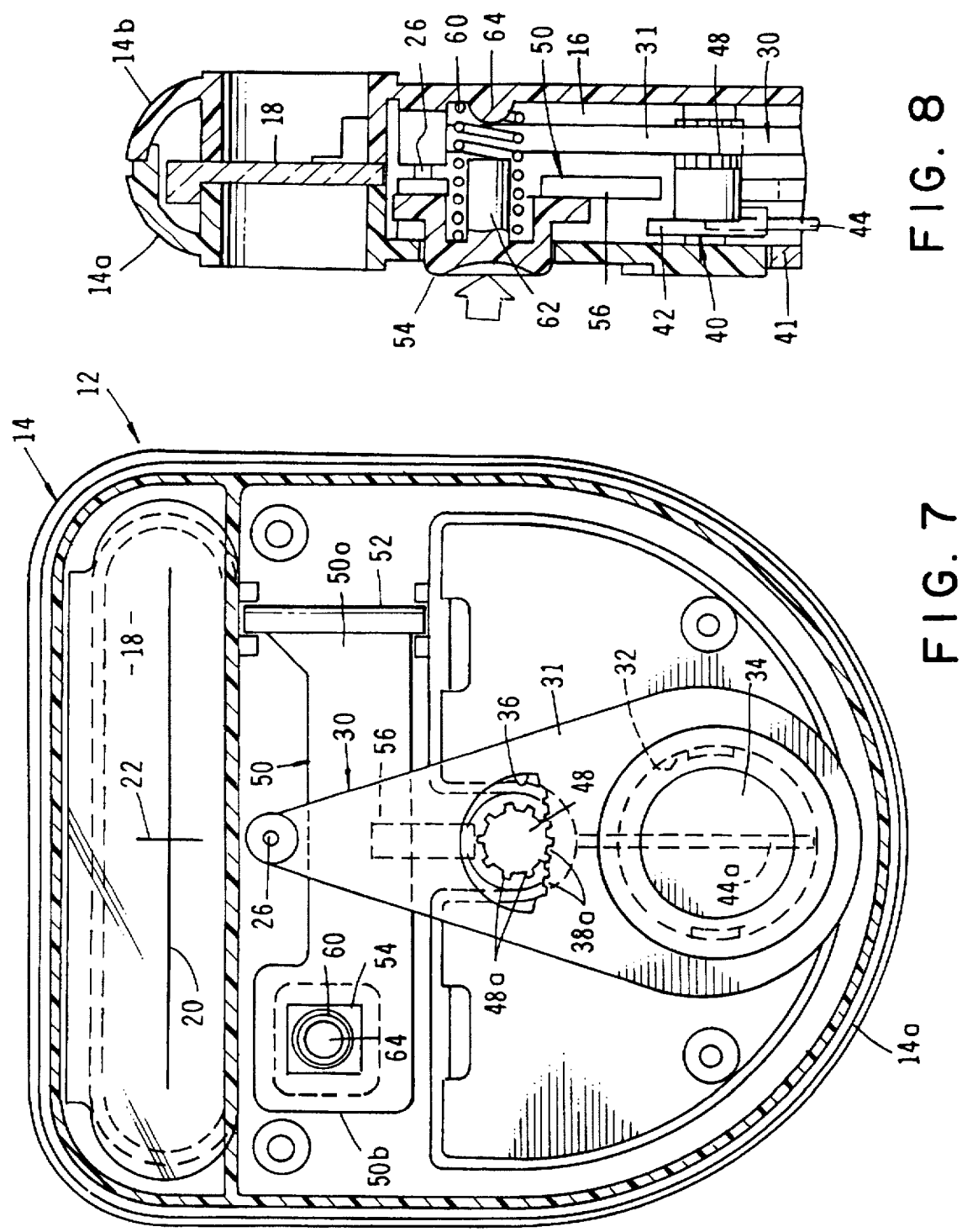
FIG. 7 is a cross-sectional view taken along lines 7—7 of FIG. 4.
FIG. 8 is a fragmentary, cross-sectional view similar to FIG. 5 but showing the locking button of the device moved into a pointer release position.
Figure 9:
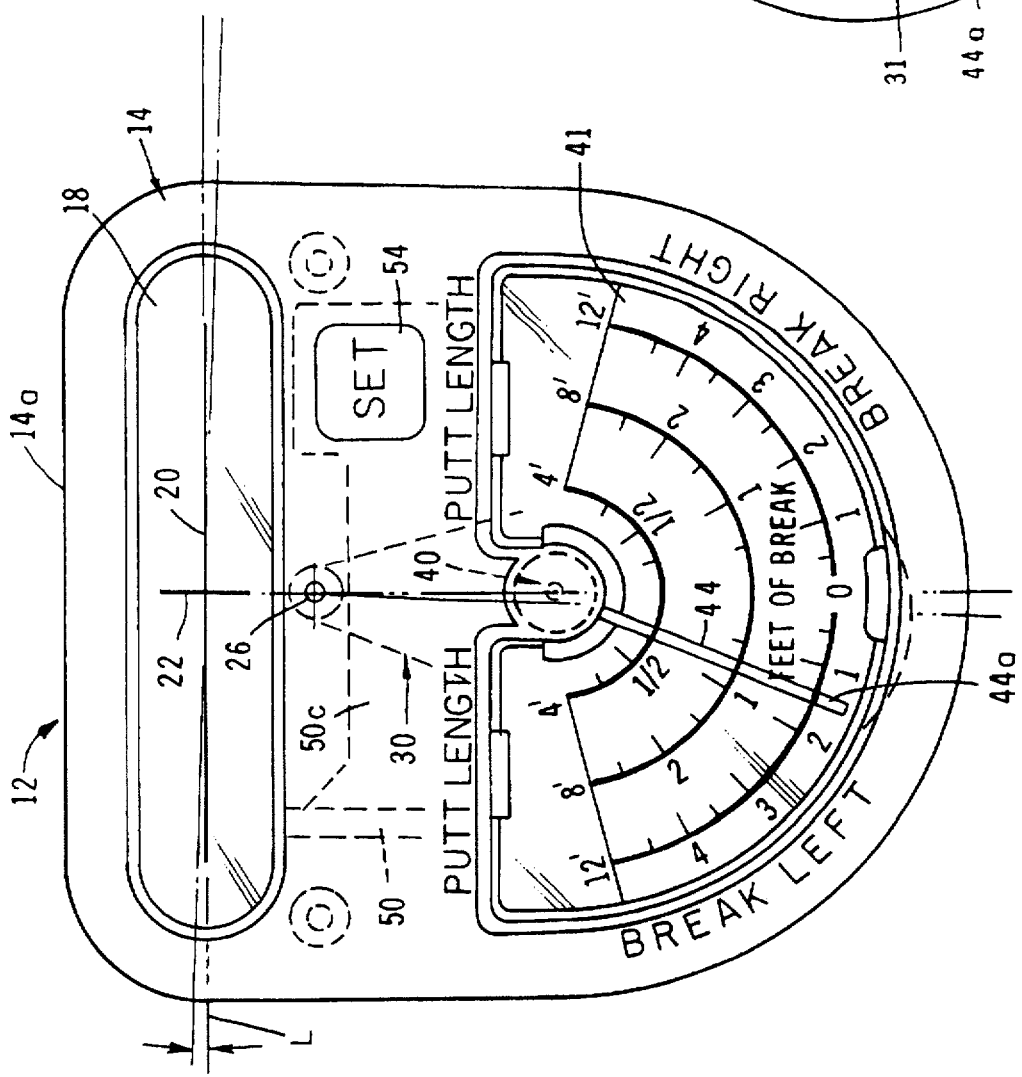
FIG. 9 is a front view similar to FIG. 1 but showing the scale imprinted on one face of the casing of the device and showing the device angled slightly with respect to horizontal to align one of the reference lines with the slope of the green causing movement of the pendulum and pointer assembly of the device to indicate that the put will break to the left by approximately one and one-half feet.
Figure 13:
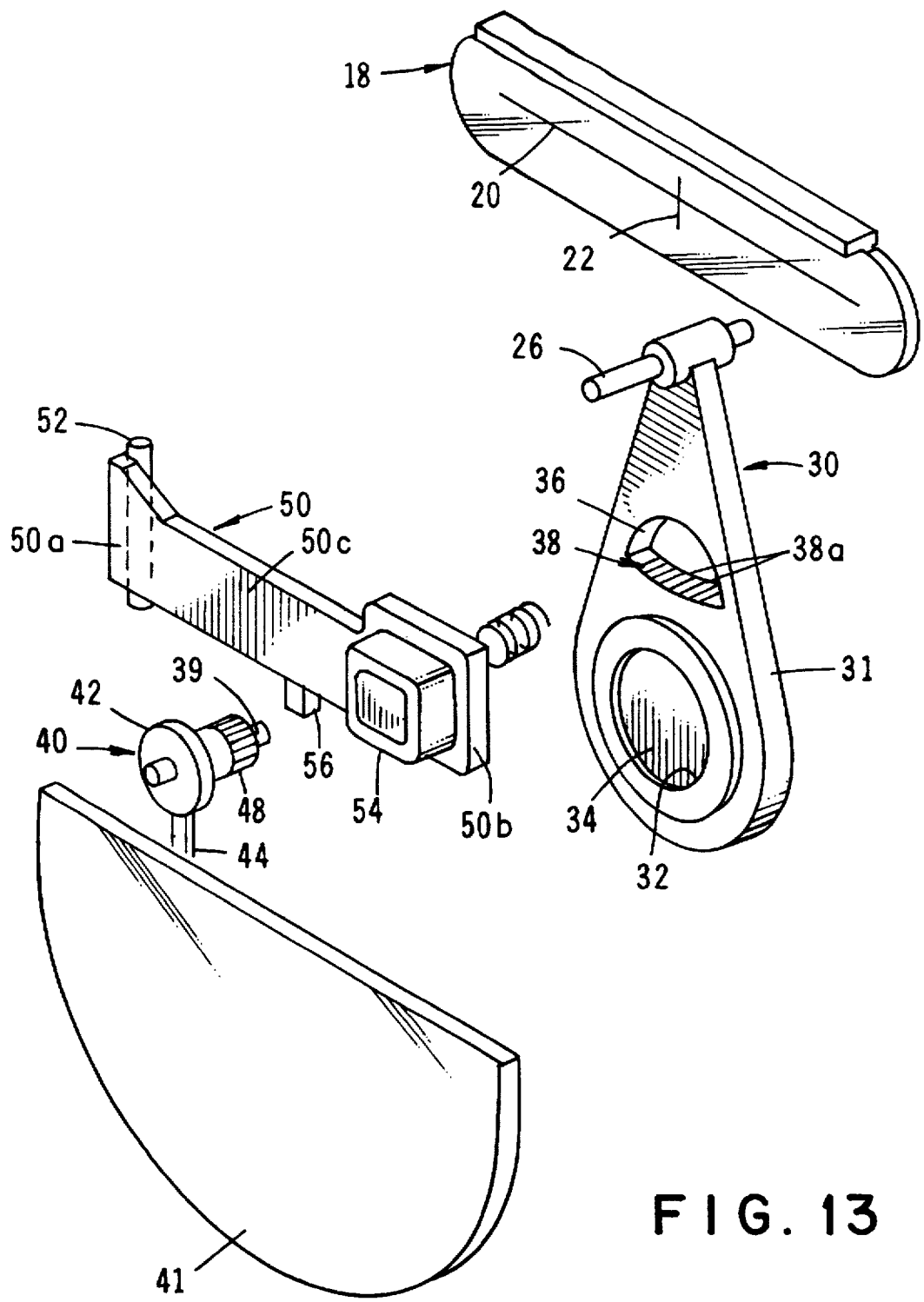
FIG. 13 is a generally perspective, exploded view of one form of the locking mechanism of the device which locks the pointer assembly of the device against pivotal movement relative to the scale provided on the device casing.

A first pivot pin 26 is connected to casing 14 and is disposed at a first location along the reference axis 24 of the device. Connected to pivot pin 26 is a pendulum assembly 30, which as best seen in FIG. 7 and 13, includes a pendulum 31 having a first opening 32, provided therein. Disposed within opening 32 is a generally circular shaped weight 34. Pendulum 31 also has a second arcuate shaped opening 36 which includes a bottom surface comprising a rack 38 made up of a plurality of generally transversely extending teeth 38a, overlaying at least a portion of pendulum assembly 30 is a scale having indicia comprising first coordinates representing distance and second coordinates representing amount of break (FIG. 9). In the form of the invention shown in the drawings, the indicia representing the scale are imprinted on a plastic window-like portion 41 which is interconnected with casing halves 14a in the manner best seen by referring to FIG. 4.

Figure 4:
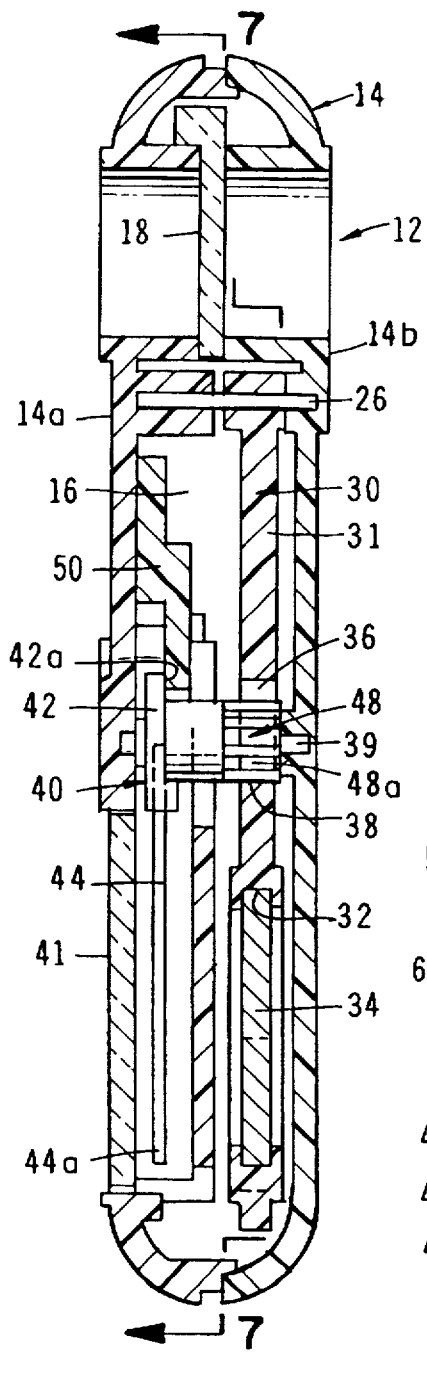
FIG. 4 is a cross-sectional view taken along lines 4—4 of FIG. 1.
Figure 5:
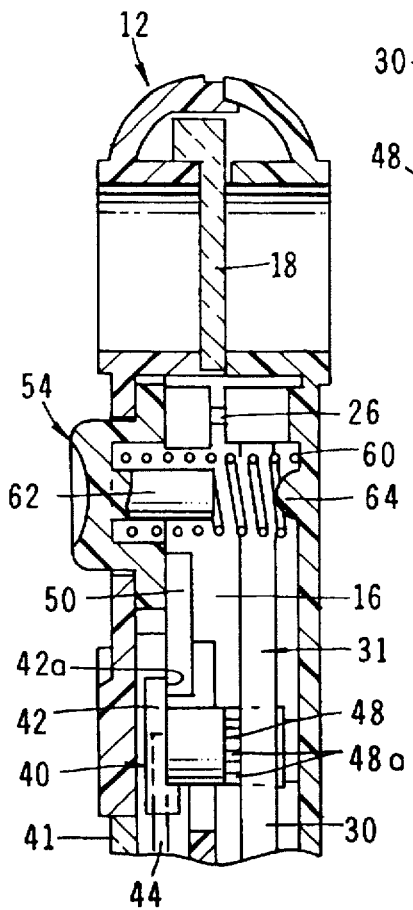
FIG. 5 is a cross-sectional view taken along lines 5—5 of FIG. 1.

Turning to FIG. 4, it can be seen that a shaft 39 is connected to support or casing 14 a at location along reference axis 24 (FIG. 1). Connected to shaft 39 and rotatable therewith is a pointer assembly generally designated by the numeral 40. Pointer assembly 40 includes a disk-like breaking surface defining member 42 having a breaking surface 42a (FIGS. 5 and 8). Connected to the breaking surface defining member 42 and extending downwardly therefrom is an elongated pointer 44. In a manner presently to be described, the free or lower end 44a of pointer 44 is disposed in close proximity with the indicia of the scale which defines the amount of break of the put in terms of feet. More particularly, in operating the device, free end 44a of the pointer moves through an arcuate path which follows the arcuate path along which the indicia representing break is imprinted (see FIG. 9).

Forming an important aspect of the apparatus of the present invention is the pointer operating means which is carried by support or casing 14 for controllably moving the pointer of the pointer assembly upon pivotal movement of the pendulum assembly 30 relative to casing 14. In the form of the invention shown in the drawings, this important pointer operating means comprises a driven means which is connected to the pointer assembly and a driving means which is connected to the pendulum for driving the driven means upon pivotal movement of the pendulum relative to pivot pin 26. As best seen by referring to FIG. 7, the driving means of the present form of the invention is here provided in the form of a gear 48 having a plurality of circumferentially spaced teeth 48a. Gear 48 is mounted on shaft 39 and is rotated by the driving means which here comprises the previously identified rack 38 formed on pendulum assembly 30.

Figure 6:
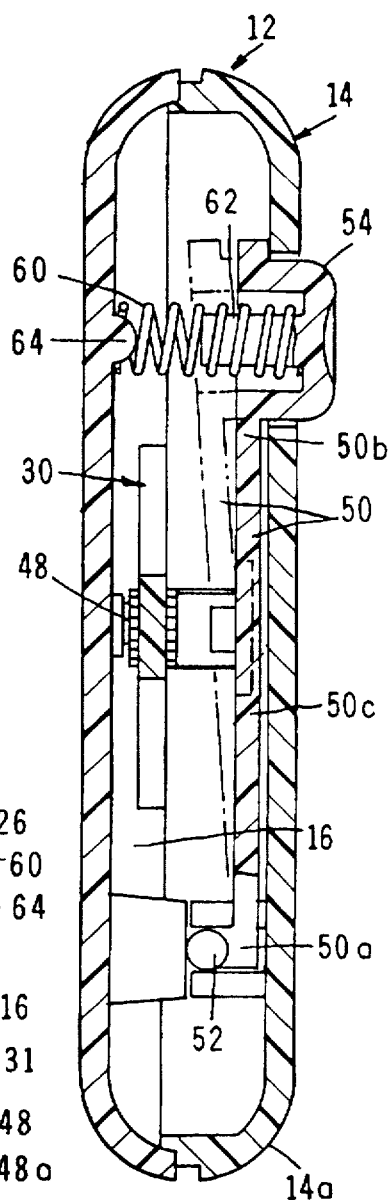
FIG. 6 is a cross-sectional view taken along lines 6—6 of FIG. 1.

Still another important aspect of the apparatus of the present invention is the locking means for controllably preventing movement of pointer 44a upon a tilting movement being imparted to the casing. This important locking means comprises a lever arm 50 (FIG. 56 and 13) have a first end 50a, a second end 50b and an intermediate portion 50c. Lever arm 50 is pivotally connected to support or casing 14 by means of a pivot pin 52. Disposed proximate second end 50b of lever 50 is a push button assembly 54 which is movable from a first position wherein the locking means is in engagement with locking surface 42a, in a manner shown in FIG. 4, to a second position where the lever arm is spaced apart from the locking surface in the manner shown in FIG. 8. More particularly, as best seen in FIG. 13, lever arm 50 is provided with a downwardly extending breaking tab 56 which is adapted to frictionally engage breaking surface 42a of the pointer assembly when the device is in a normal at-rest position as shown in FIG. 5. However, when the locking button is depressed in the manner shown in FIG. 8, tab 56 will move away from breaking surface 42a of the pointer assembly thereby enabling pivotal movement of the pointer assembly in response to forces exerted by the driving means or rack assembly 38 provided on pendulum assembly 30. To maintain locking tab 56 in locking engagement with breaking surface 42a, biasing means are provided. These biasing means here include a coil spring 60 which, as best seen in FIG. 6, surrounds an inwardly extending stem 62 provided on push button assembly 54. Coil spring 60 is held in alignment with the casing by protuberance 64 formed on casing half 14b and functions to maintain spring 60 in the proper position relative to the casing in the manner shown in FIG. 6. Spring 60 is such that it is easily yieldably deformed upon a force being exerted on the push button in the direction of the arrow of FIG. 6 which moves the lever assembly into the position shown by the phantom lines in FIG. 6.

Figure 10:
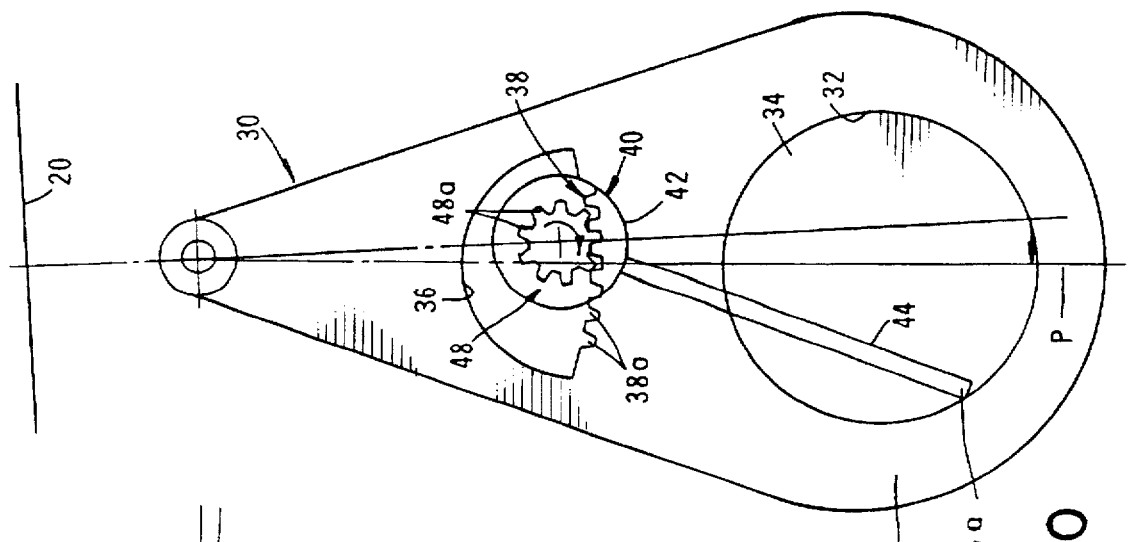
FIG. 10 is a diagrammatic view of the pendulum and pointer assembly mechanism as they appear when the casing of the device is tilted in the manner shown in FIG. 9.

In using the apparatus of the invention, the player stands behind the ball and, looking through sighting window 18, places the intersection point of lines 20 and 22 over the center of the putting cup. This done the device is carefully tilted until line 20 follows the slope of the green as might be defined by a putter lying on the putting green proximate the cup. (See lines "L" in FIG. 9, which represents the slope of the green). With the device maintained in this position, push button 54 is gently pushed inwardly in the manner shown in FIG. 8. This causes tab 56 to move away from surface 42a of the pointer assembly permitting the pendulum assembly 30 to swing by force of gravity toward the vertical position shown in FIG. 10. As the pendulum assembly swings, the driving means or rack 38 will drive the driven means or gear 48 in a clockwise direction as shown in FIG. 10. This, in turn, will cause the pointer 44 to move into the indicating position shown wherein it extends at an acute angle with respect to plumb line "P". At this location, pointer end 44a resides between the numbers 1 and 2 on the scale indication that the putt will break to the left by an amount of one and one-half feet. With this information, the player can aim the putt along a line approximately one and one-half feet above the putting cup.

Figure 12:
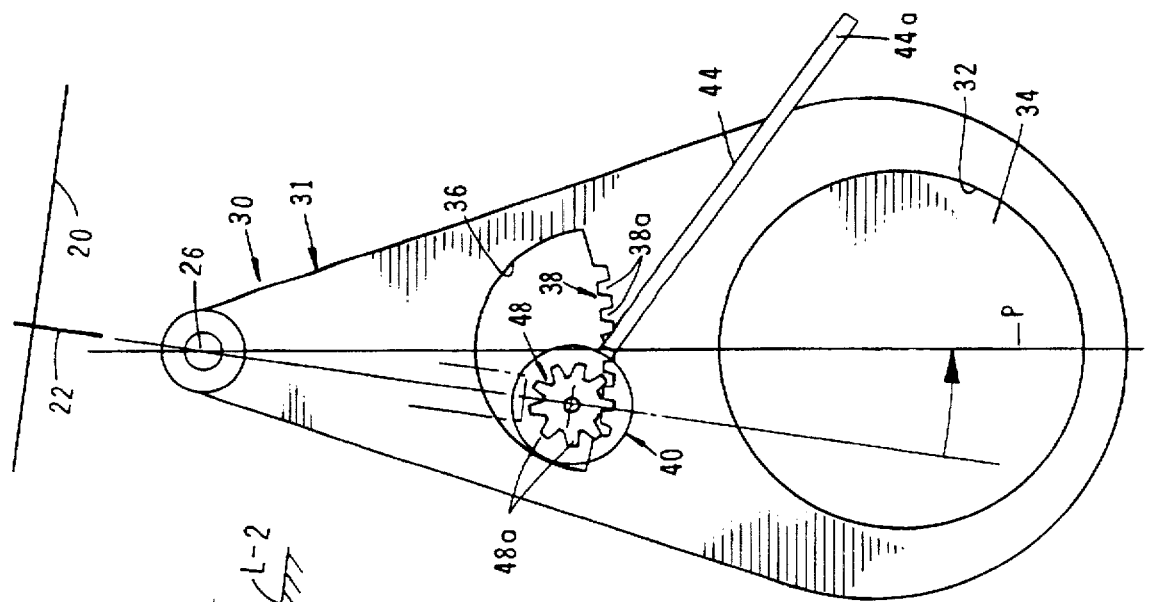
FIG. 12 is a diagrammatic view similar to FIG. 10 but showing the movement of the pendulum and pointer assembly components of the device as a result of the tilting of the casing into the orientation shown in FIG. 11.
Figure 11:
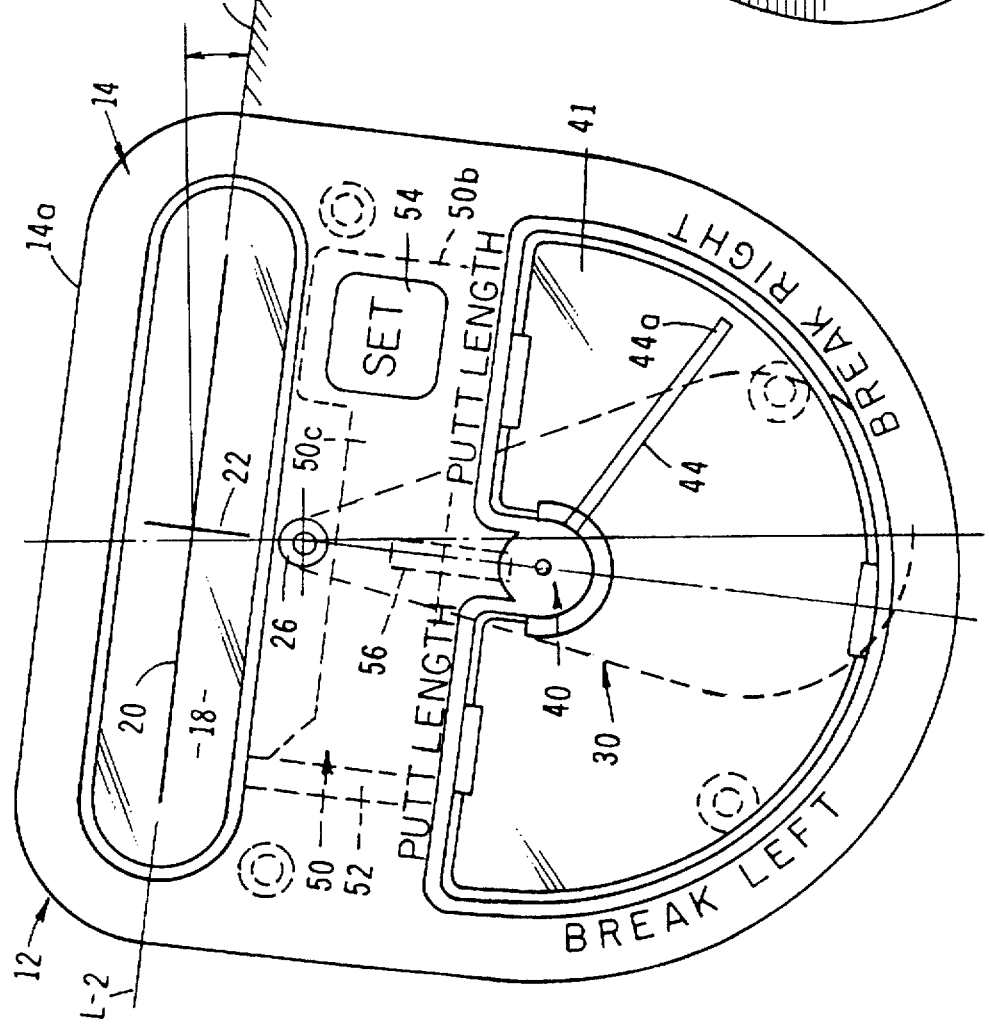
FIG. 11 is a front view similar to FIGS. 1 and 9, but showing the casing having been tilted in an opposite direction to cause one of the reference lines to line up with the slope of the green and causing the pendulum and pointer mechanisms to indicate that the put involved will break to the right by a distance greater than the break indicated in FIG. 9.

When the putting green slopes in the opposite direction, as shown in FIGS. 11 and 12, the player once again stands behind the ball and, looking through sighting window 18 places the intersection point of lines 20 and 22 over the center of the putting cup. This done, the device is carefully tilted until line 20 follows the slope of the green or along slope line L-20 (FIG. 11). With the device maintained in this position, push button 54 is once again gently pushed inwardly in the manner shown in FIG. 8. As before, this causes tab 56 to move away from surface 42a of the pointer assembly permitting the pendulum assembly 30 to swing by force of gravity toward the vertical position shown in FIG. 12. As the pendulum assembly swings, the driving means or rack 38 will in this instance drive the driven means or gear 48 in a counter clockwise direction as shown in FIG. 12. This, in turn, will cause the pointer 44 to move into the indicating position shown in FIG. 12 wherein it extends at an acute angle with respect to plumb line "P" shown in FIG. 12. At this location, pointer end 44a resides between the numbers imprinted on the "break right" side of the scale indicating that the put will break to the right by the amount indicated by the scale numbers.

The scale for the device, which is preferably of the design shown in FIG. 9, was determined exponentially using the well known Stimpmeter. The Stimpmeter is a device typically used by golf superintendents to establish consistent green speed. The device itself comprises an extruded aluminum bar, 36 inches long, with a V-shaped groove extending along its entire length. It has a precisely milled bail release notch 30" from the tapered end (the end that rests on the ground). The underside of the tapered end is milled away to reduce bounce as a rolling ball makes contact with the green.

The V-shaped groove has an included angle of 145 degrees, thereby supporting a golf ball at two points ½ inch apart. A ball rolling down the groove has a slight overspin, which is thoroughly consistent and has no deleterious effect on the ensuring measurements.

The ball-release notch is designed so that a ball will always be released and start to roll when the Stimpmeter is raised to an angle of approximately 20 degrees. This feature ensures that the velocity of the ball will always be the same when it reaches the tapered end.

To determine the amount of break of a ball traveling a fixed distance of, for example, 9 feet on the green having a known measured slope of, for example, five degrees a tee is placed at the starting point. The Stimpmeter is then held by the notched end with the tapered end resting on the ground next to the tee. The Stimpmeter is then aimed in the desired direction and raised sufficiently to cause the ball to travel 9 feet. By observing the roll of the ball it is a simple matter to determine the break, which in this particular instance would be about 4 feet. Continued experimentation on greens of varying slopes with the ball roll of various distances will provide accurate data of the degree of break which will occur at various degrees of slit. For example, such experimentation determined that for standard greens a one percent slope would result in an eight degree break, a two degree slope would result in a sixteen degree break, a three degree slope would result in a twenty-four degree break and so on. Using this data, the preferred scale as shown in FIG. 9 was determined.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

We claim:

1. A putting aid for use in determining the amount of break of a golf ball rolling along a sloping green between a first point and second point, said putting aid comprising:

(a) a support having a first reference line and reference axis extending generally perpendicular to said first reference line;

(b) a pivot pin connected to said support at a first location along said reference axis;

(c) a pendulum member connected to said pivot pin for pivotal movement with respect to said reference axis;

(d) a scale overlaying at least a portion of said pendulum, said scale having first coordinates representing distance and second coordinates representing amount of break;

(e) a pointer assembly pivotally connected to said support, said pointer assembly being movable from a first position to a second position; and (f) pointer operating means carried by said support for moving said pointer assembly response to pivotal movement of said pendulum member.

2. A putting aid as defined in claim 1 in which said pointer operating means comprises:

(a) driven means connected to said pointer assembly; and (b) driving means connected to said pendulum for driving said driven means upon pivotal movement of said pendulum.

3. A putting aid as defined in claim 2 in which said drive means comprises a gear rotatably connected to said support and in which said driving means comprises a rack provided on said pendulum for operating engagement with said gear.

4. A putting aid as defined in claim 2 further including locking means for releasably locking said pointer assembly against movement.

5. A putting aid as defined in claim 4 in which said locking means comprises a push button mechanism connected to said support comprising:

(a) a lever arm having a first end, a second end, and an intermediate portion, said first end being pivotally connected to said support and said intermediate portion being engageable with said pointer assembly;

(b) a push button disposed proximate said second end of said lever arm for moving a said intermediate portion of said lever arm from a first position in engagement with said pointer assembly to a second position spaced apart from said pointer assembly; and (c) biasing means for yieldably resisting movement of said push button from said first position to said second position.

6. A putting aid as defined in claim 5 in which said pointer assembly includes a breaking surface defining member and an elongated pointer connected to said breaking surface defining member and in which said intermediate portion of said lever arm includes a breaking surface engaging tab for engagement with said breaking surface to block movement of said pointer assembly.

7. A putting aid as defined in claim 6 in which said elongated pointer has a first end and a second end movable along an arcuate path and in which said second coordinates of said scale comprise a plurality of members disposed proximate said arcuate path.

8. A putting aid for use in determining the amount of break of a golf ball rolling along a sloping green between a first point and second point, said putting aid comprising:
   (a) a support having:
      (i) a viewing window having a first reference line imprinted thereon; and
      (ii) a reference axis extending generally perpendicularly with respect to reference line;
   (b) a pivot pin connected to said support at a first location along said reference axis;
   (c) a pendulum member pivotally connected to said pivot pin for pivotal movement with respect to said reference axis;
   (d) a shaft connected to said support at a second location along said reference axis;
   (e) a gear rotatably connected to said shaft,
   (f) a scale overlaying said pendulum member and said gear, said scale having first coordinates representing distance and second coordinates representing amount of break; and
   (g) a pointer connected to said gear and rotatable therewith relative to said scale from a first position to a second position wherein said reference line is angularly inclined relative to horizontal.

9. A putting aid as defined in claim 8 further including locking means carried by said support for preventing rotation of said gear.

10. A putting aid as defined in claim 8 in which said locking means comprises a push button mechanism connected to said support comprising:
   (a) a lever arm having a first end, a second end, and an intermediate portion, said first end being pivotally connected to said support and said intermediate portion being engageable with said pointer assembly;
   (b) a push button disposed proximate said second end of said lever arm for moving a said intermediate portion from first position in engagement with said pointer assembly to a second position spaced apart from said pointer assembly; and
   (c) biasing means for yieldably resisting movement of said push button from said first position to said second position.

11. A putting aid as defined in claim 9 in which said pointer assembly includes a breaking surface and an elongated pointer connected to said breaking surface and in which said intermediate portion of said lever arm includes a breaking surface engaging tab for engagement with said breaking surface to block movement of said pointer assembly.

12. A putting aid as defined in claim 11 in which said elongate pointer has a first end and a second end movable along an arcuate path and in which said second coordinates of said scale comprise a plurality of members disposed proximate said arcuate path.

* * * * *

UNITED STATES PATENT AND TRADEMARK OFFICE
CERTIFICATE OF CORRRECTION

PATENT NO. : 5,792,015
DATED : Aug. 11, 1998
INVENTOR(S) : Hoyt, et al.

It is certified that error appears in the above-identified patent and that said Letters Patent is hereby corrected as shown below:

On the title page, in item [56], References Cited, insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 1 | 8 | 4 | 8 | 1 | 7 | 2/9/93 | Kanelous | | | |
| | | 4 | 9 | 8 | 4 | 7 | 9 | 1 | 1/15/91 | Labell | | | |
| | | 4 | 8 | 2 | 4 | 1 | 1 | 4 | 4/25/89 | Catalano | | | |
| | | 3 | 5 | 3 | 5 | 7 | 9 | 2 | 7/9/68 | Douglas | | | |
| | | | | | | | | | | | | | |

Signed and Sealed this

Thirteenth Day of April, 1999

Attest:

Q. TODD DICKINSON

Attesting Officer

Acting Commissioner of Patents and Trademarks